(12) United States Patent
Grier

(10) Patent No.: US 12,060,043 B2
(45) Date of Patent: Aug. 13, 2024

(54) MOTORCYCLE LIFT SYSTEM

(71) Applicant: David E. Grier, Brookhaven, NY (US)

(72) Inventor: David E. Grier, Brookhaven, NY (US)

(73) Assignee: David E. Grier, Brookhaven, NY (US)

( * ) Notice: Subject to any disclaimer, the term of this patent is extended or adjusted under 35 U.S.C. 154(b) by 76 days.

(21) Appl. No.: 17/564,823

(22) Filed: Dec. 29, 2021

(65) Prior Publication Data

US 2022/0219651 A1 Jul. 14, 2022

Related U.S. Application Data

(60) Provisional application No. 63/135,867, filed on Jan. 11, 2021.

(51) Int. Cl.
  *B60S 9/04* (2006.01)
  *B66F 7/28* (2006.01)

(52) U.S. Cl.
  CPC . *B60S 9/04* (2013.01); *B66F 7/28* (2013.01)

(58) Field of Classification Search
  CPC .......................................................... B60S 9/04

USPC ....................................................... 254/133 R
See application file for complete search history.

(56) References Cited

U.S. PATENT DOCUMENTS

| 1,936,107 | A | * | 11/1933 | Cunneen | .................. | B66F 7/18 |
| | | | | | | 187/217 |
| 1,952,906 | A | * | 3/1934 | Cyrus | ..................... | B66F 7/18 |
| | | | | | | 187/217 |
| 2010/0051884 | A1 | * | 3/2010 | Matthews | ............... | B66F 7/28 |
| | | | | | | 254/45 |

FOREIGN PATENT DOCUMENTS

CN   113003469 A  *  6/2021  ............ B66F 7/0666

OTHER PUBLICATIONS

CN-113003469-A translation (Year: 2021).*

* cited by examiner

*Primary Examiner* — Abbie E Quann
(74) *Attorney, Agent, or Firm* — Sorell, Lenna & Schmidt, LLP

(57) ABSTRACT

A vehicle lift includes a mechanical lift including a platform and at least one extension being movable relative to the platform. Systems, devices and methods are disclosed.

17 Claims, 19 Drawing Sheets

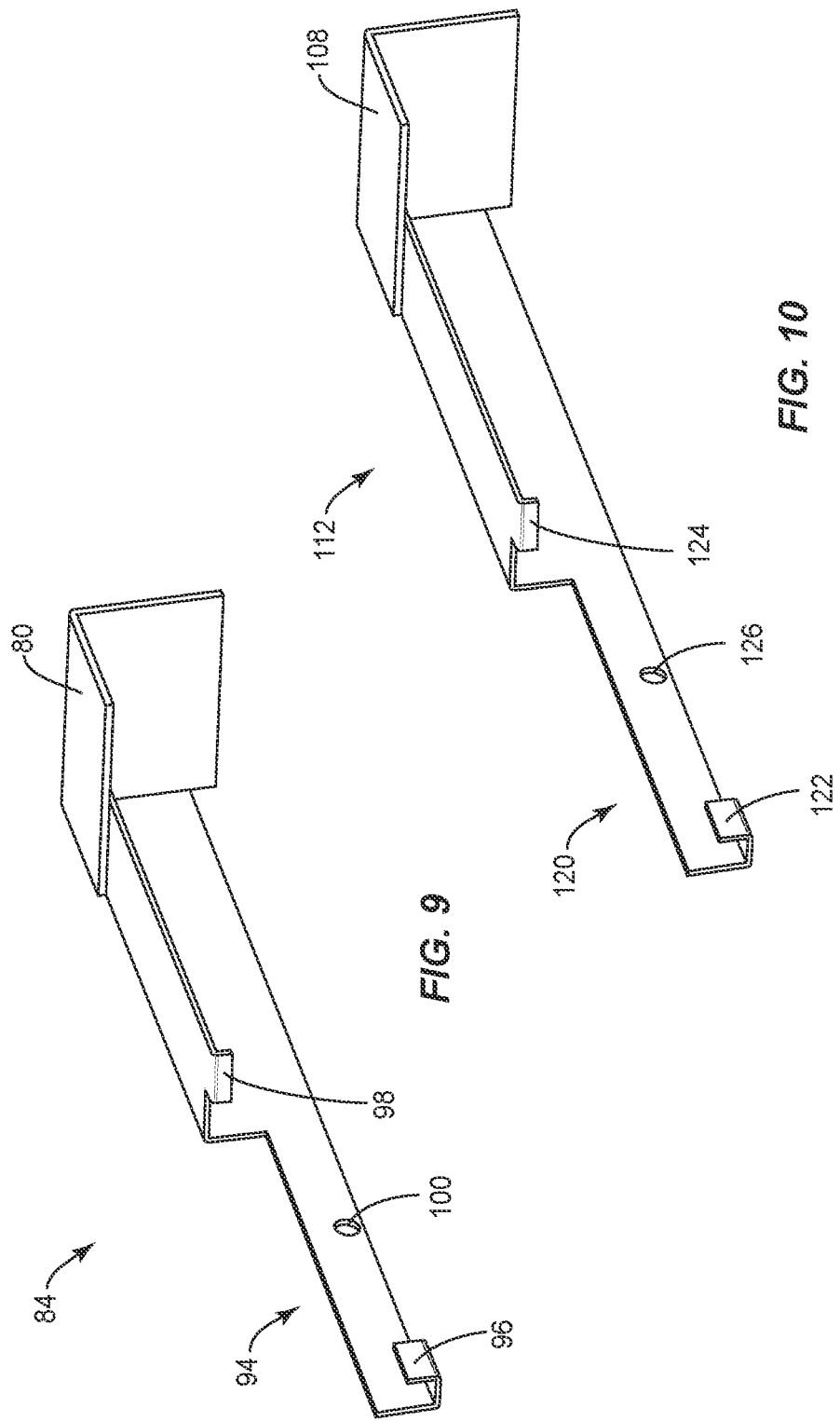

MOTORCYCLE LIFT SYSTEM

TECHNICAL FIELD

The present disclosure generally relates to lifting and supporting devices for use with motor vehicles, and more particularly to a motorcycle lift system having one or more extensions that facilitate maintenance and loading of a motorcycle, and storage of a motorcycle lift.

BACKGROUND

Motorcycle lifts are known and used to elevate a motorcycle, for example, to perform maintenance, such as, engine repair, tire changing and the like. Motorcycle lifts are also used to lift and convey motorcycles into an area of a vehicle, for example, the bed of a truck for transport or a storage space, for example, a garage for storage. However, while existing motorcycle lifts are configured to elevate the entirety of the motorcycle from the wheels, these lifts may not provide the desired stability needed and weight distribution required for retaining a motorcycle properly and safely for a selected use.

Existing motorcycle lifts can include fixed extensions that attempt to provide an increased work space, however, may not provide the necessary stability for support of a vehicle. Further, these extensions may increase the size of the lift such that the lift is cumbersome, which makes moving and storing the lift difficult. This disclosure describes an improvement over these prior technologies.

SUMMARY

In one embodiment, a vehicle lift is provided. The vehicle lift includes a mechanical lift including a platform and at least one extension being movable relative to the platform. In some embodiments, systems, devices and methods are disclosed.

In one embodiment, a motorcycle lift is provided. The motorcycle lift includes a mechanical lift including a platform. A first side extension is rotatable relative to the platform and a second side extension is rotatable relative to the platform.

In one embodiment, the motorcycle lift includes a mechanical lift including a platform. The platform includes a first support and a second support being movable relative to the platform. A first side extension is rotatable relative to the platform between a first orientation and a second orientation such that the first side extension engages the first support. A second side extension is rotatable relative to the platform between a first orientation and a second orientation such that the second side extension engages the second support.

BRIEF DESCRIPTION OF THE DRAWINGS

The present disclosure will become more readily apparent from the specific description accompanied by the following drawings, in which:

FIG. 9 is a perspective view of components shown in FIG. 1;

FIG. 10 is a perspective view of components shown in FIG. 1;

DETAILED DESCRIPTION

Figure 1:
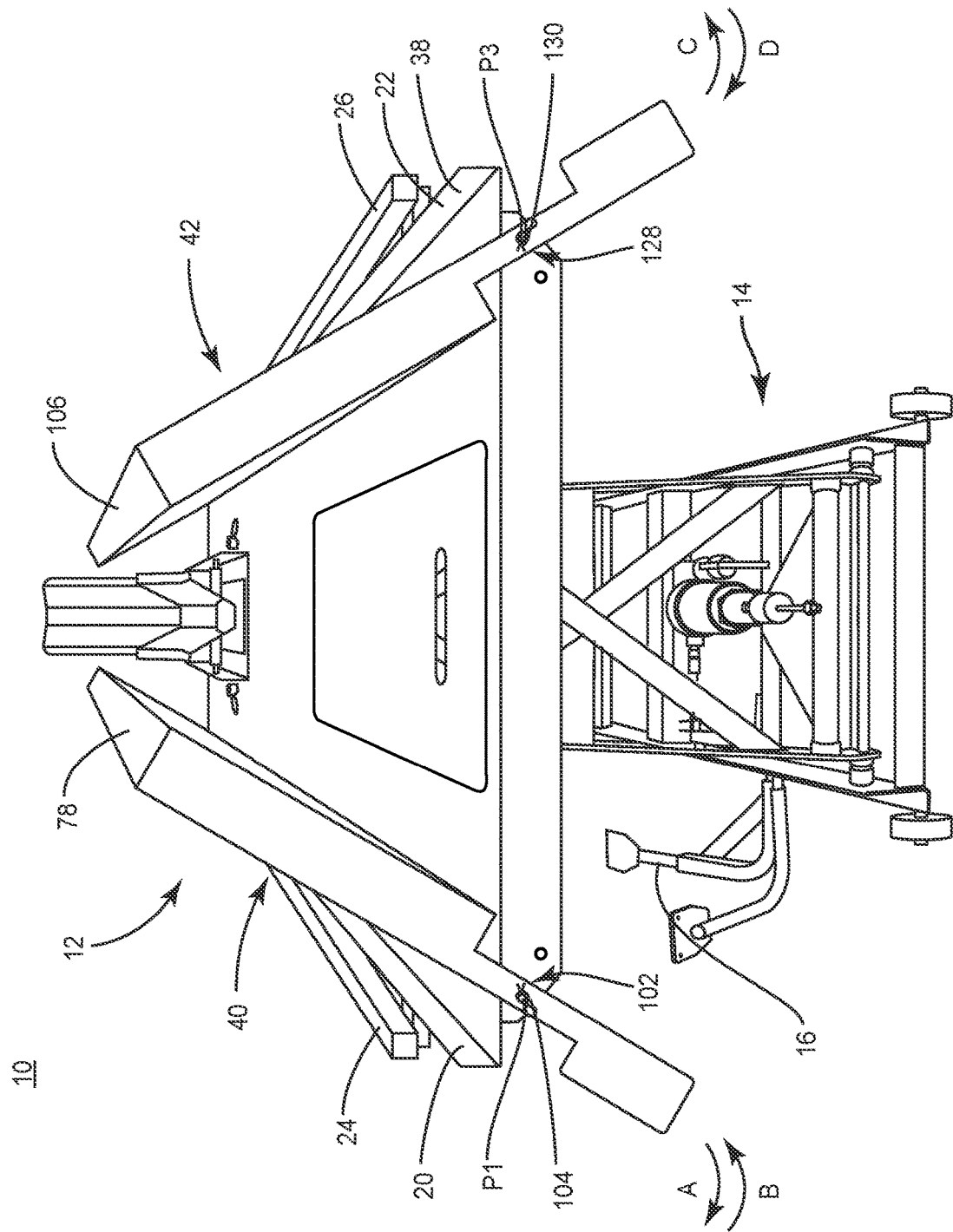
FIG. 1 is a perspective view of components of one embodiment of a motorcycle lift system in accordance with the principles of the present disclosure.

The present disclosure generally relates to lifting and supporting devices for use with motor vehicles, and more particularly to a motorcycle lift system having one or more extensions that facilitate maintenance and loading of a motorcycle, and storage of a motorcycle lift. In some embodiments, the present motorcycle lift system includes a vehicle lift. In some embodiments, the vehicle lift includes a mechanical lift including a platform and at least one extension being movable relative to the platform.

In some embodiments, the present motorcycle lift system includes at least one extension. In some embodiments, the at least one extension includes two extensions. In some embodiments, the extensions are lateral, front, and/or side extensions. In some embodiments, each extension rotates via one or more pivot points relative to a platform of the motorcycle lift for storage purposes. In some embodiments, the extensions can be rotated at an angle relative to the platform. In some embodiments, the extensions can be incrementally rotated at a selected angle relative to the platform. In some embodiments, the extensions can be rotated at a selected angle of 0 to 90 degrees. In some embodiments, the extensions are rotated orthogonally relative to the platform. In some embodiments, the extensions are independently rotatable. In some embodiments, the extensions are rotatable relative to the platform in one or a plurality of orientations. In some embodiments, the extensions are rotatable relative to the platform to a storage orientation. In some embodiments, in the storage orientation, the extensions rotate in an upward direction when the motorcycle lift is not in use. In some embodiments, the extensions are removable from the motorcycle lift.

In some embodiments, the present motorcycle lift system includes extensions. In some embodiments, the motorcycle lift improves safety due to the extensions being rotatable in a storage orientation. In some embodiments, in the storage orientation, the motorcycle lift can remain stationary and does not have to be removed from a work area. In some embodiments, in the storage orientation, the motorcycle lift can be carried and stored in a different location than the work area. In some embodiments, the motorcycle lift is positioned in the storage orientation to provide space around the motorcycle lift. In some embodiments, the storage orientation provides two additional feet of space around the perimeter of the motorcycle lift.

In some embodiments, the present motorcycle lift system includes extensions. In some embodiments, the extensions are configured to support the weight of a vehicle. In some embodiments, the extensions can support a weight of one thousand pounds. In some embodiments, each extension is configured to support a weight of about 350 pounds. In some embodiments, the extensions are configured to support a weight of about 700 pounds.

In some embodiments, the present motorcycle lift system includes extensions and a sliding structural support. In some embodiments, the extensions and/or sliding structural support include a plurality of surfaces configured to support the weight of a vehicle. In some embodiments, the plurality of surfaces include at least five surfaces configured to support the weight of a vehicle. In some embodiments, the motorcycle lift can be positioned in a partial storage orientation. In some embodiments, in the partial storage orientation, at least one extension is positioned in the storage orientation. In some embodiments, in the partial storage orientation, the motorcycle lift can be employed as a work bench to work on a vehicle, for example, a motorcycle. In some embodiments, when the motorcycle lift is employed as a work bench, one or both of the extensions can be positioned in an operational orientation. In some embodiments, in the operational orientation, an extension is rotated in a downward direction to place the extension in a horizontal position.

In some embodiments, the present motorcycle lift system includes a footboard that provides stability and safety when a motorcycle or other vehicle is loaded onto the lift. In some embodiments, components of the motorcycle lift can be included in a kit configured to adapt to extensions of a lift. In some embodiments, the present motorcycle lift system includes one or more sliding structural supports engageable with a motorcycle lift, for example, a lift that does not include extensions. In some embodiments, the structural supports are configured to add new dimensions to a motorcycle lift that includes extensions.

In some embodiments, the present motorcycle lift system includes brackets and sliding structural supports. In some embodiments, the brackets and structural supports are integral with a body of an extension. In some embodiments, the extension includes rotating brackets and structural supports. In some embodiments, the structural supports are removable. In some embodiments, each bracket includes a body and an arm. In some embodiments, the arm includes an upper stop, a lower stop and a fulcrum. In some embodiments, the fulcrum is configured for rotating the extension via a pivot and provides safety. In some embodiments, each bracket includes an end of the extension. In some embodiments, each bracket is permanently fixed to an outer edge of the extension. In some embodiments, each bracket is permanently fixed to the outer edge of the extension via one or more bolts and/or welding. In some embodiments, the bracket can be welded or bolted to the extension to form an outer frame of the extension. In some embodiments, a length of the bracket and/or the extension can be variously configured depending on dimensions of the motorcycle lift, for example, the length of the motorcycle lift.

In some embodiments, the present motorcycle lift system includes one or more extensions. In some embodiments, the present motorcycle lift system includes two extensions. In some embodiments, each extension includes a platform. In some embodiments, the platform is attached to an outer frame of the extension and includes an angled lip disposed on an inner edge of the platform. In some embodiments, the angled lip is matingly engaged with an angled lip of a platform of the motorcycle lift. In some embodiments, engagement of the angled lips is configured to stabilize the plurality of surfaces on the extension configured to support the weight of a vehicle and also limits downward rotation of the extension to a level, horizontal or flat orientation. In some embodiments, engagement between the platform and the outer frame of the extension is variously configured.

In some embodiments, the present motorcycle lift system includes one or more brackets. In some embodiments, each bracket is identical to each other. In some embodiments, the body of the bracket is configured to permanently engage to the outer edge of the extension. In some embodiments, the body of the bracket permanently engages the extension via bolts or welding. In some embodiments, each extension is configured for engagement with a single bracket on each end of the extension. In some embodiments, the dimensions of the bracket can vary depending on the dimensions of the motorcycle lift.

In some embodiments, the arm of each bracket rotates via a fulcrum, for example, a pivot point relative to the motorcycle lift by one or more pins, for example, clevis pins. In some embodiments, the pins are configured for disposal through the pivot point so as to allow the lower stop of the bracket arm to rotate in a downward direction and the upper stop of the bracket body to rotate in an upward direction, for example, the storage orientation. In some embodiments, when the bracket arm is rotated in a downward direction, the upper and lower stops operate in conjunction with the lip of the platform to limit downward rotation to a level, horizontal position. In some embodiments, the lower stop of the arm is positioned under a front and rear of the motorcycle lift to rotate in a downward direction and the upper stop is positioned above a top of the front and rear of the motorcycle lift to rotate the arm in an upward direction, thereby placing the extension in the storage orientation.

In some embodiments, the upper and lower stops of the arm are configured to support the weight of a vehicle, for example, a four wheel vehicle including an all-terrain vehicle (ATV) that is mounted on the motorcycle lift. In some embodiments, the upper and lower stops are configured to provide weight bearing distribution. In some embodiments, the upper and lower stops are configured to provide weight bearing distribution in four locations on the motorcycle lift.

In some embodiments, the present motorcycle lift system includes two rotatable side extensions. In some embodiments, each of the extensions include a support, for example, a sliding structural support that operates in conjunction with brackets and a lip of a platform of the extension. In some embodiments, the structural support includes a receiver fixed to the motorcycle lift. In some embodiments, the receiver is fixed to the motorcycle lift via a bolt. In some embodiments, the structural supports includes a sliding insert and a cross bar. In some embodiments, the receiver includes a tubular member. In some embodiments, the insert is configured for slidable engagement with the tubular member. In some embodiments, the insert includes an outer diameter that is smaller than an inner diameter of the tubular member for slidable engagement between the insert and the tubular member. In some embodiments, the insert and/or the tubular member are square or round shaped.

In some embodiments, the insert is slidably insertable and securable to the receiver via corresponding openings of the receiver and the insert. In some embodiments, a pin is disposable and removable within the corresponding openings. In some embodiments, a cross bar is fixedly connected to an end of the insert. In some embodiments, the cross bar is permanently connected to the insert via welding. In some embodiments, the cross bar can be connected to one or more inserts to form a web of structural support underneath each extension. In some embodiments, the web is configured to provide safety to the lift by distributing the weight of any vehicle over one or more additional surfaces along the sides of the motorcycle lift. In some embodiments, the receiver is permanently fixed to the underside of the motorcycle lift platform with a receiving end terminating at approximately an outer edge of the motorcycle lift to allow the insert and the cross bar to be removeable for storage purposes. In some embodiments, structural supports can be used with or without the cross bars depending upon the particular motorcycle lift that the structural supports are being used with, for example, motorcycle lifts that do not include an angled lip.

In some embodiments, the present motorcycle lift system includes an extension including a bracket. In some embodiments, the bracket includes a lip configured to attach under front and rear bottom edges of an extension. In some embodiments, the bracket includes an upper stop and a lower stop. In some embodiments, the stops and a structural support can be employed with platforms of extensions that do not include an angled lip to enhance the weight distribution of the extension and to provide rotation to the extension. In some embodiments, the motorcycle lift includes a platform including a lip that performs similarly to an angled lip disposed on an extension platform. In some embodiments, the combination of the brackets, the lip on the extension platform and the structural supports, enable weight of a vehicle, for example, a four wheel vehicle to be transferred to both sides of the motorcycle lift platform along an entire length of the lift and to the structural supports of the motorcycle lift.

In some embodiments, the present motorcycle lift system includes a jack having a foot pump configured to expand and contract to elevate a platform of the lift. In some embodiments, the foot pump is pneumatic. In some embodiments, the foot pump includes a pair of pedals. In some embodiments, the pair of pedals are configured for engagement with a pair of pedal extensions. In some embodiments, the pair of pedal extensions are configured to extend the pair of pedals beyond a side extension of the lift to facilitate clearance of the pair of pedals relative to the side extension. In some embodiments, the side extension is in an operational orientation and the pair of pedals are implemented to expand and contract to elevate the platform. In some embodiments, the pair of pedal extensions includes a first pedal extension that includes a rod, a bearing and a base. In some embodiments, the base includes a block configured to contact the rod and/or bearing and to engage a surface that the lift is disposed on. In some embodiments, the first pedal extension is configured for releasing pressure, for example, hydraulic pressure such that the platform of the lift is lowered relative to the floor. In some embodiments, the pair of pedal extensions includes a second pedal extension that has a rod and a bearing. In some embodiments, the second pedal extension is configured for pumping pressure into the lift such that the platform of the lift is elevated. In some embodiments, the bearings of the pair of pedal extensions are configured to retain the pair of pedal extensions in a straight orientation during pivoting of the pedal extensions. In some embodiments, the pair of pedal extensions are pivotable up to 90 degrees relative to the lift.

The system of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a vehicle lift, for example, a motorcycle lift and related methods of use in accordance with the principles of the present disclosure. Alternate embodiments are also disclosed. Reference is made in detail to the exemplary embodiments of the present disclosure, which are illustrated in the accompanying figures. Turning to FIGS. 1-14, there are illustrated components of a motorcycle lift system 10.

The components of motorcycle lift system 10 can be fabricated from materials suitable for automotive applications, including metals, synthetic polymers and/or their composites. For example, the components of motorcycle lift system 10, individually or collectively, can be fabricated from materials such as steel, stainless steel alloys, aluminum, commercially pure titanium, titanium alloys, Grade 5 titanium, cobalt-chrome alloys, thermoplastics such as polyaryletherketone (PAEK) including polyetheretherketone (PEEK), polyetherketoneketone (PEKK) and polyetherketone (PEK), carbon-PEEK composites, PEEK-BaSO4 polymeric rubbers, polyethylene terephthalate (PET), polyurethane, polymeric rubbers, polyolefin rubbers, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, and their combinations.

The components of motorcycle lift system 10, individually or collectively, may also be fabricated from a heterogeneous material such as a combination of two or more of the above-described materials. The components of motorcycle lift system 10 may be monolithically formed, integrally connected or include fastening elements and/or instruments, as described herein.

Figure 2:
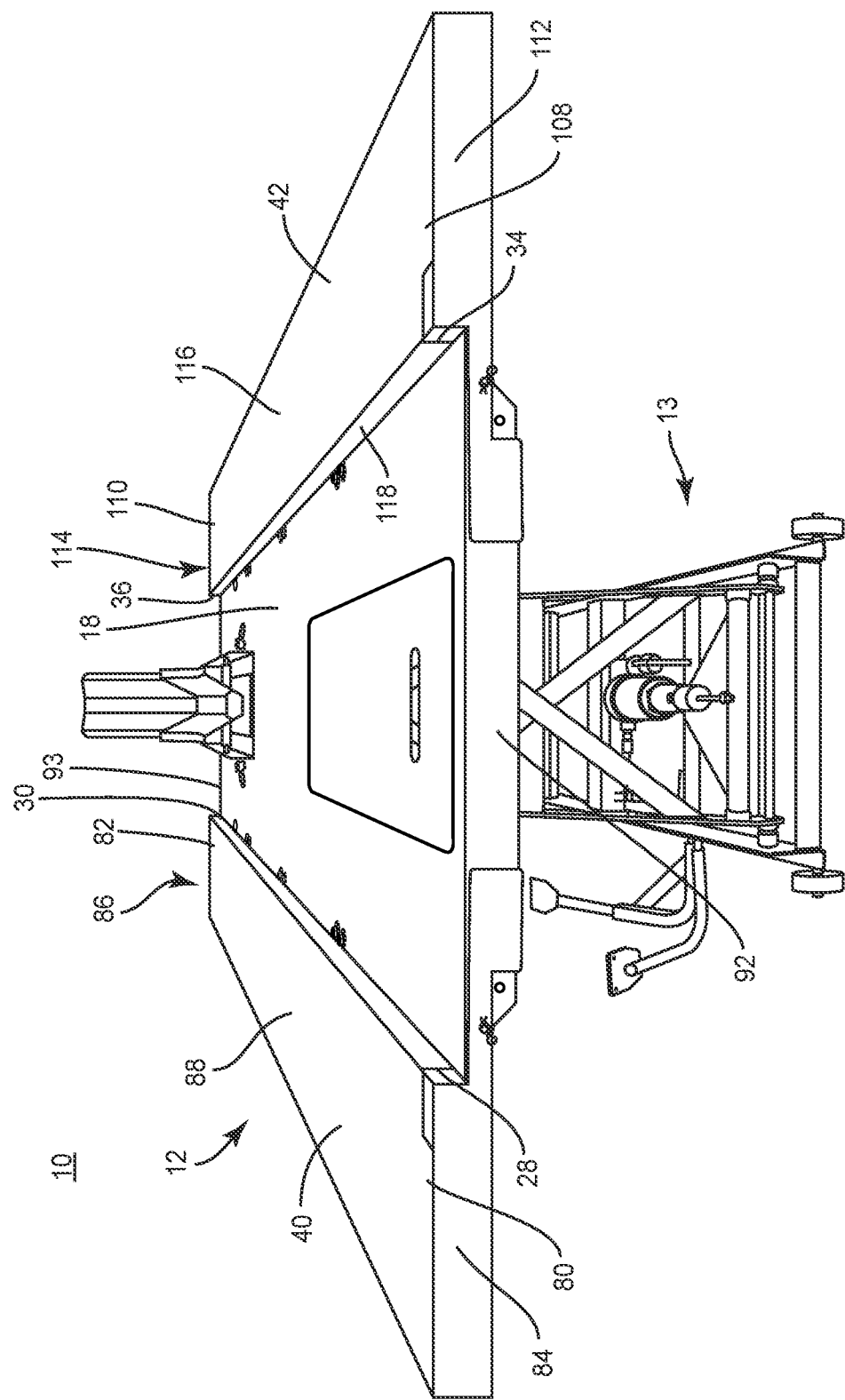
FIG. 2 is a perspective view of the components shown in FIG. 1.

Motorcycle lift system 10 includes a mechanical lift 12, as shown in FIGS. 1 and 2. Lift 12 includes a scissor style lift. Lift 12 includes a jack 14. Jack 14 is configured to expand and contract via a pneumatic foot pump 16 to elevate a platform 18 of lift 12. Jack 14 is fixed to platform 18, as shown in FIG. 2. Platform 18 is rectangular. In some embodiments, platform 18 may be variously configured, for example, round, oval, oblong, triangular, square, polygonal, irregular, uniform, non-uniform, variable, and/or tapered. In some embodiments, platform 18 can be manufactured from steel, including a steel diamond plate configuration.

Figure 8:
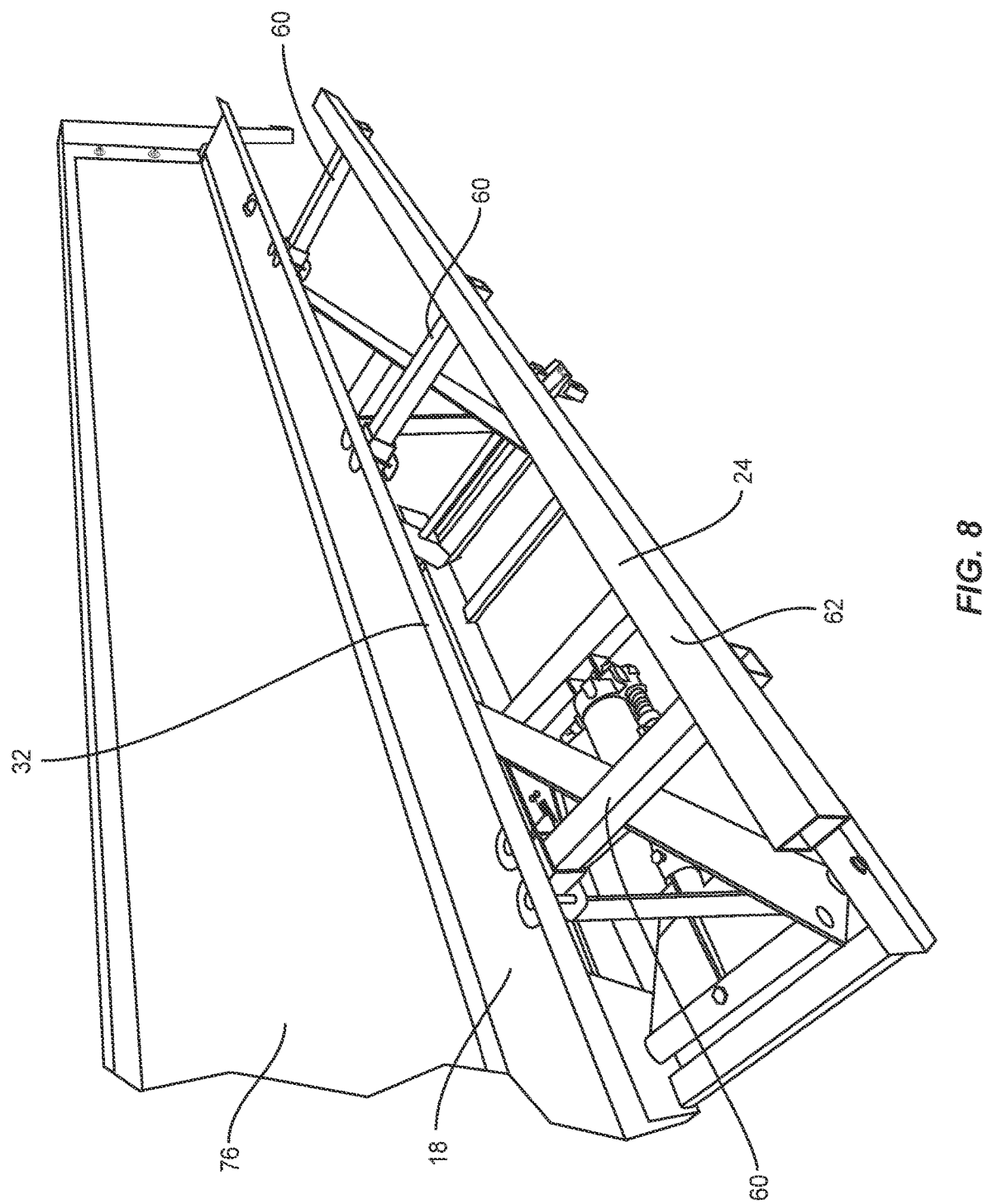
FIG. 8 is a break away perspective view of components shown in FIG. 1.

Platform 18 includes a side 20 and a side 22, as shown in FIG. 1. Side 20 is configured for engagement with a support 24 and side 22 is configured for engagement with a support 26, as described herein. Supports 24, 26 are movable relative to platform 18. Side 20 extends between an end 28 and an end 30, as shown in FIG. 2. An angled lip 32 extends between ends 28, 30 and is defined from a surface of platform 18, as shown in FIG. 8. Side 22 extends between an end 34 and an end 36, as shown in FIG. 2. An angled lip 38 extends between ends 34, 36 and is defined from a surface of platform 18, as shown in FIG. 1. In some embodiments, lips 32, 38 can be variously configured, including irregular, uniform, non-uniform, offset, staggered, undulating, arcuate, variable and/or tapered.

Figure 3:
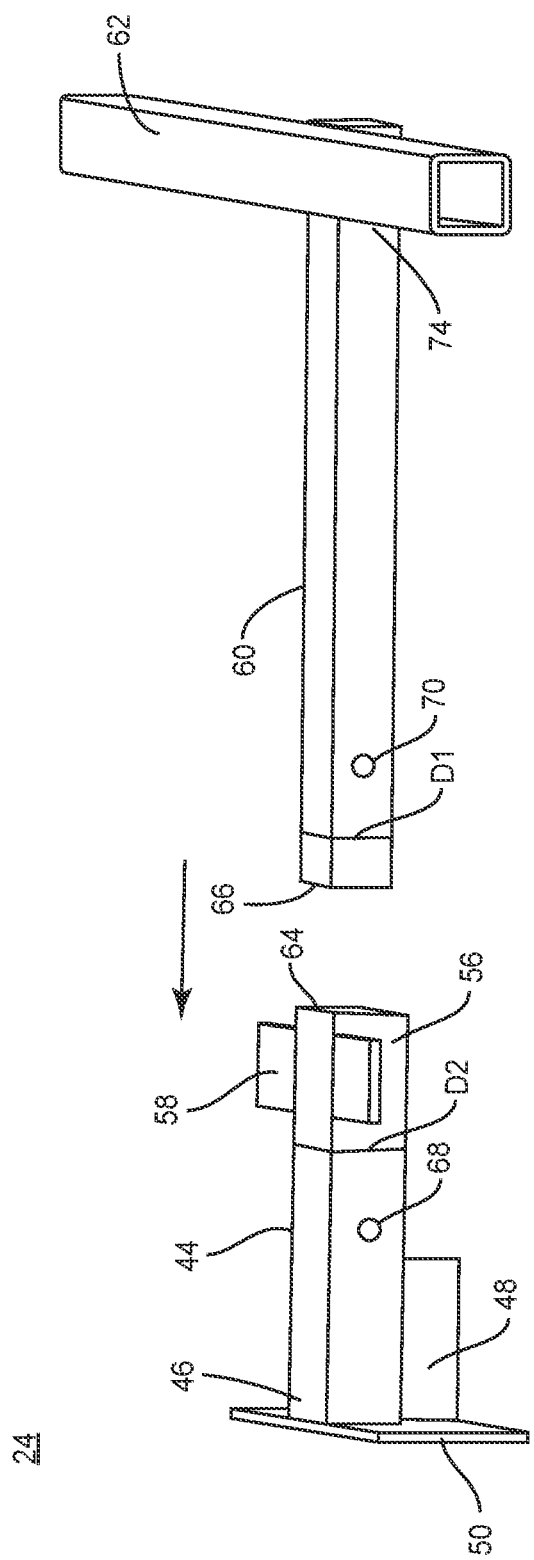
FIG. 3 is a perspective view with parts separated of components shown in FIG. 1.
Figure 4:
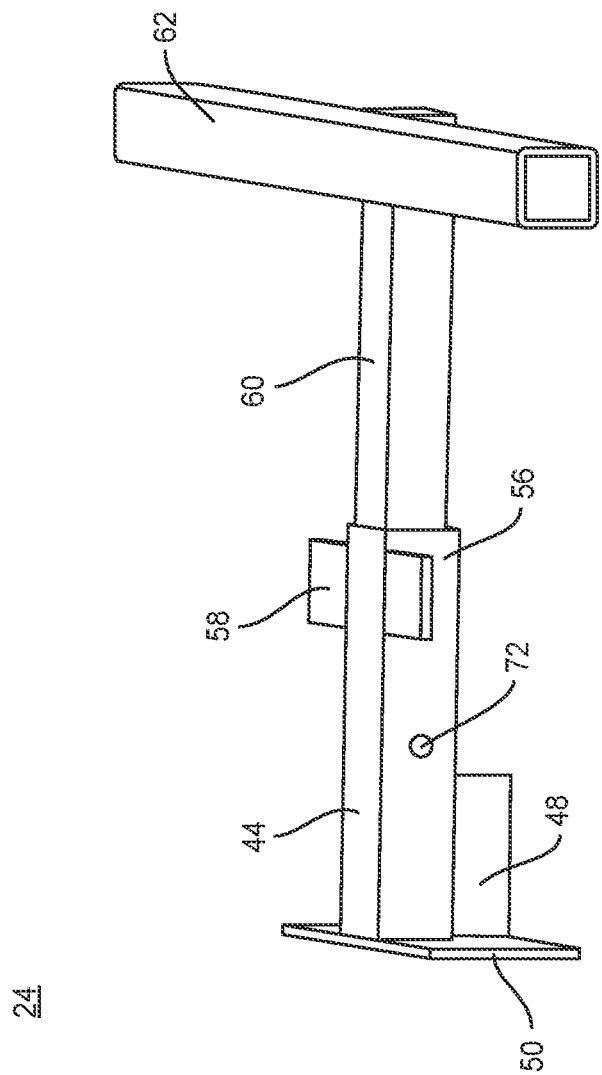
FIG. 4 a perspective view of components shown in FIG. 3.
Figure 5:
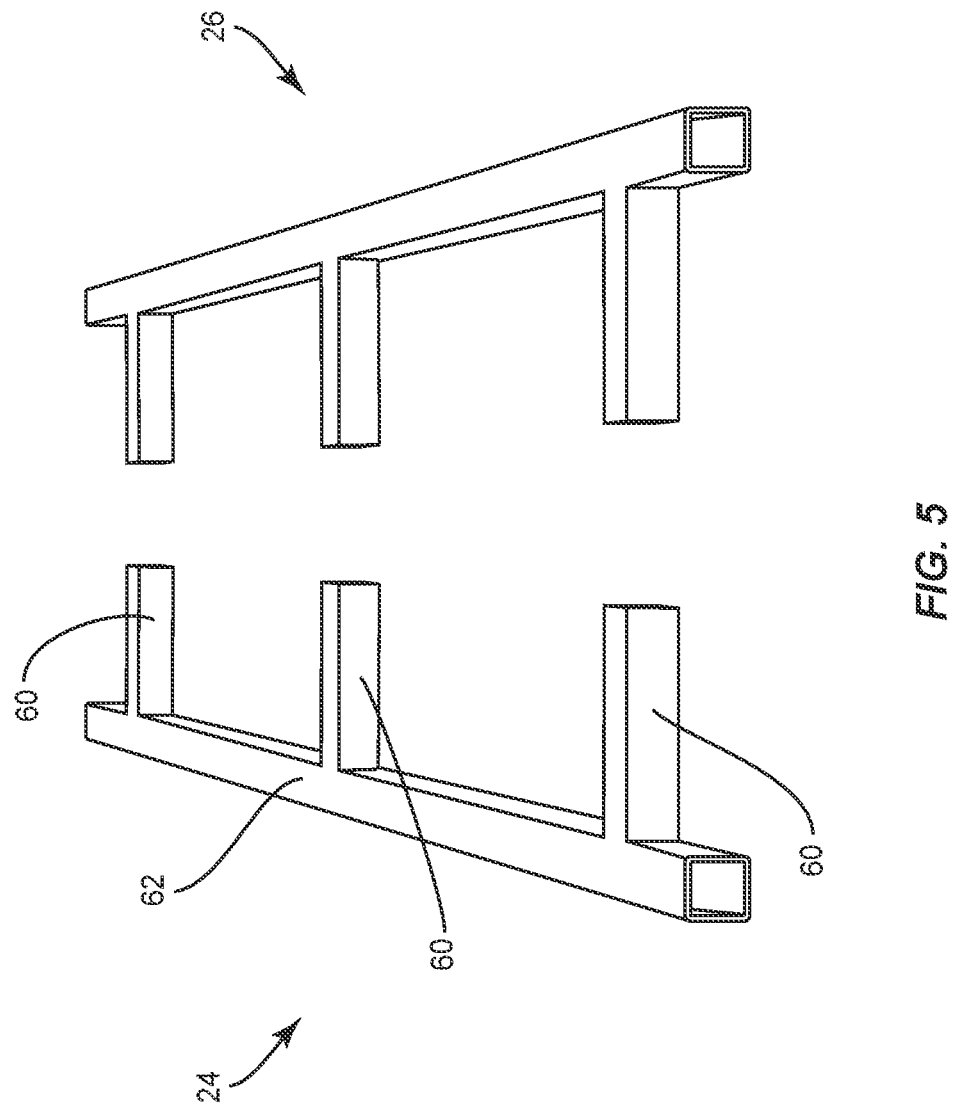
FIG. 5 is a break away perspective view of components shown in FIG. 1.
Figure 6:
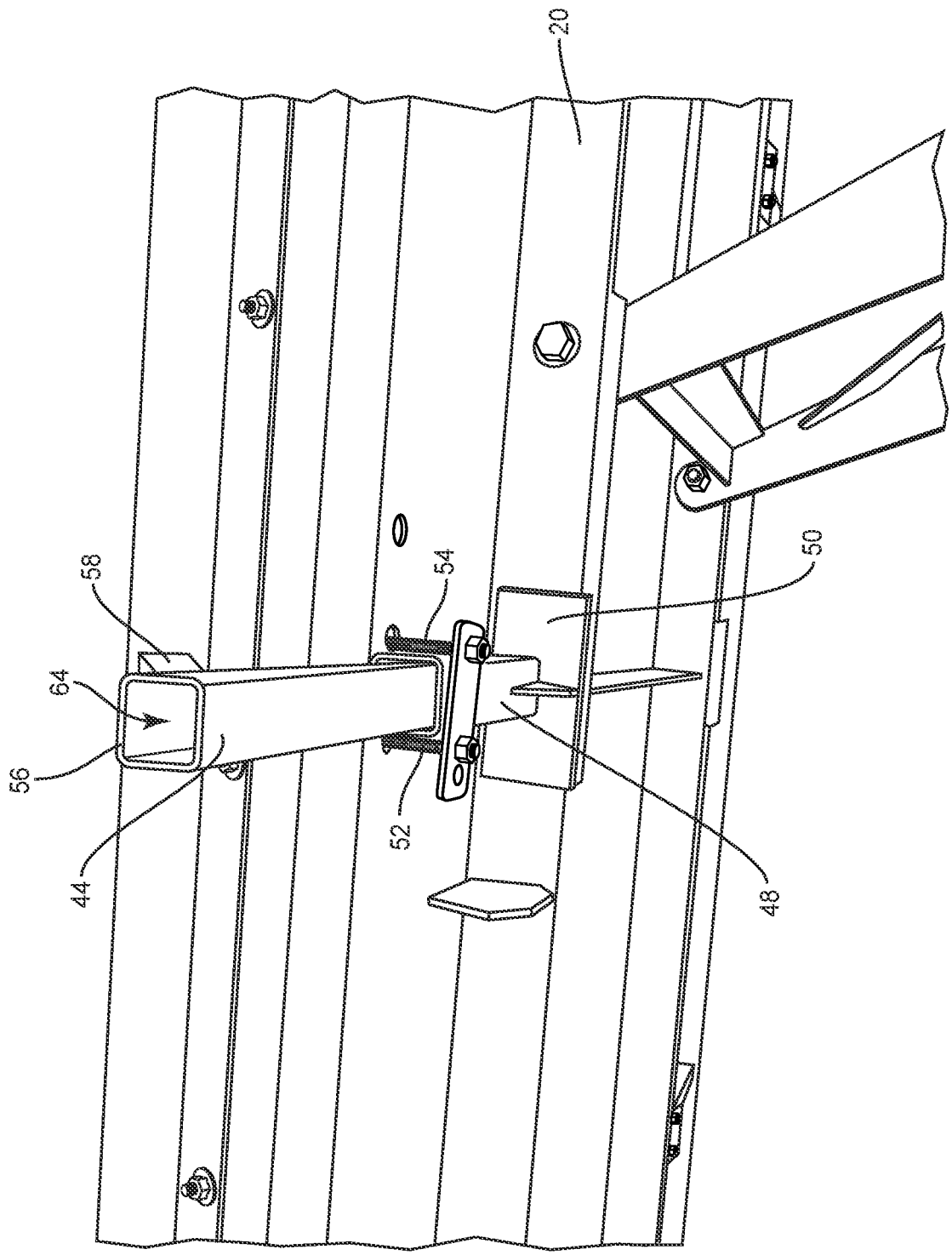
FIG. 6 is a break away perspective view of components shown in FIG. 1.
Figure 7:
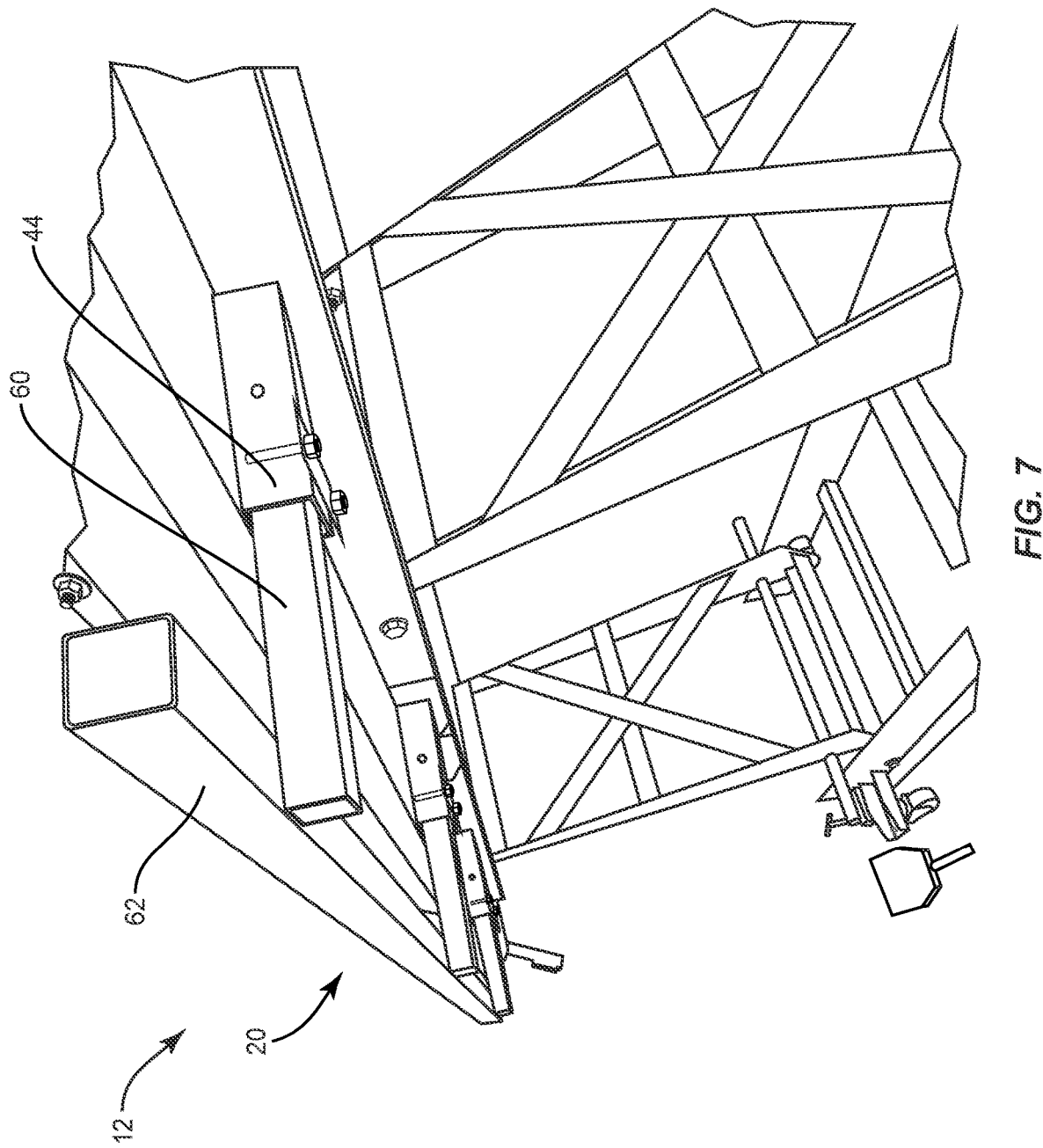
FIG. 7 is a break away perspective view of components shown in FIG. 1.

Structural supports 24, 26 are movable relative to platform 18 and are engageable with extensions 40, 42 respectively, as described herein. In some embodiments, structural support 24 is similar to structural support 26. Structural support 24 includes a receiver 44, as shown in FIGS. 3 and 4. Receiver 44 is hollow and has a tubular cross-section configuration. Receiver 44 is fixed to a surface of lift 12 on side 20. An end 46 of receiver 44 is disposed within a structural brace 48. Brace 48 is fixedly engaged with a load transfer plate 50 engaged with side 20, as shown in FIG. 6. Brace 48 is fixed to platform 18 via bolts 52, 54. An end 56 of receiver 44 is fixed to a surface of lift 12 via tabs 58, as shown in FIGS. 3 and 6. In some embodiments, structural support 24 includes more than one receiver 44. In some embodiments, structural support 24 includes three receivers 44, as shown in FIG. 5. In some embodiments, receiver 44 may have various cross-section configurations, for example, round, oval, oblong, triangular, rectangular, square, polygonal, irregular, uniform, non-uniform, variable, and/or tapered.

Structural support 24 includes an insert 60 and a cross bar 62, as shown in FIGS. 3-5, 7 and 8. Insert 60 has a tubular cross-section configuration. Insert 60 is configured for slidable disposal within receiver 44. A surface of receiver 44 defines a cavity 64 and an end 66 of insert 60 is slidably disposed through cavity 64, as shown in FIGS. 3 and 4. Insert 60 includes an outer diameter D1 that is smaller than an inner diameter D2 of receiver 44 for slidable disposal within receiver 44, as shown in FIG. 3.

A surface of receiver 44 defines an opening 68 and a surface of insert 60 defines an opening 70, as shown in FIG. 3. A pin 72 is disposed within openings 68, 70 to fix insert 60 with receiver 44. In some embodiments, insert 60 engages with receiver 44 via a threaded engagement. In some embodiments, insert 60 engages with receiver 44 in a snap fit engagement, a friction fit engagement, and/or a male/female engagement. In some embodiments, insert 60 may have various cross-section configurations, for example, round, oval, oblong, triangular, rectangular, square, polygonal, irregular, uniform, non-uniform, variable, and/or tapered.

Cross bar 62 is transversely fixed to an end 74 of insert 60, as shown in FIG. 3. In some embodiments, cross bar 62 is permanently fixed to insert 60 via welding. In some embodiments, cross bar 62 can be fixed to one or more inserts 60 to form a web of structural support underneath extension 40. In some embodiments, the web is configured to provide safety to lift 12 by including a plurality of surfaces configured to support the weight of a vehicle. In some embodiments, the plurality of surfaces include at least five surfaces configured to support the weight of a vehicle. In some embodiments, structural support 24 is removable from lift 12. In some embodiments, insert 60 and cross bar 62 are stored against a bottom surface 76 of extension 40 and a portion of platform 18, as shown in FIG. 8.

Structural support 24 is configured for engagement with extension 40 and structural support 26 is configured for engagement with extension 42. In some embodiments, extensions 40, 42 are lateral, front, and/or side extensions. Extension 40 is rotatable relative to platform 18 between a plurality of orientations, for example, a storage orientation and an operational orientation such that extension 40 engages structural support 24, as described herein. In some embodiments, extension 40 can be rotated at an angle relative to platform 18. In some embodiments, extension 40 can be incrementally rotated at a selected angle relative to platform 18. In some embodiments, extension 40 can be rotated at a selected angle of 0 to 90 degrees. In some embodiments, extension 40 is rotated orthogonally relative to platform 18. In some embodiments, extension 40 is independently rotatable relative to extension 42.

Figure 11:
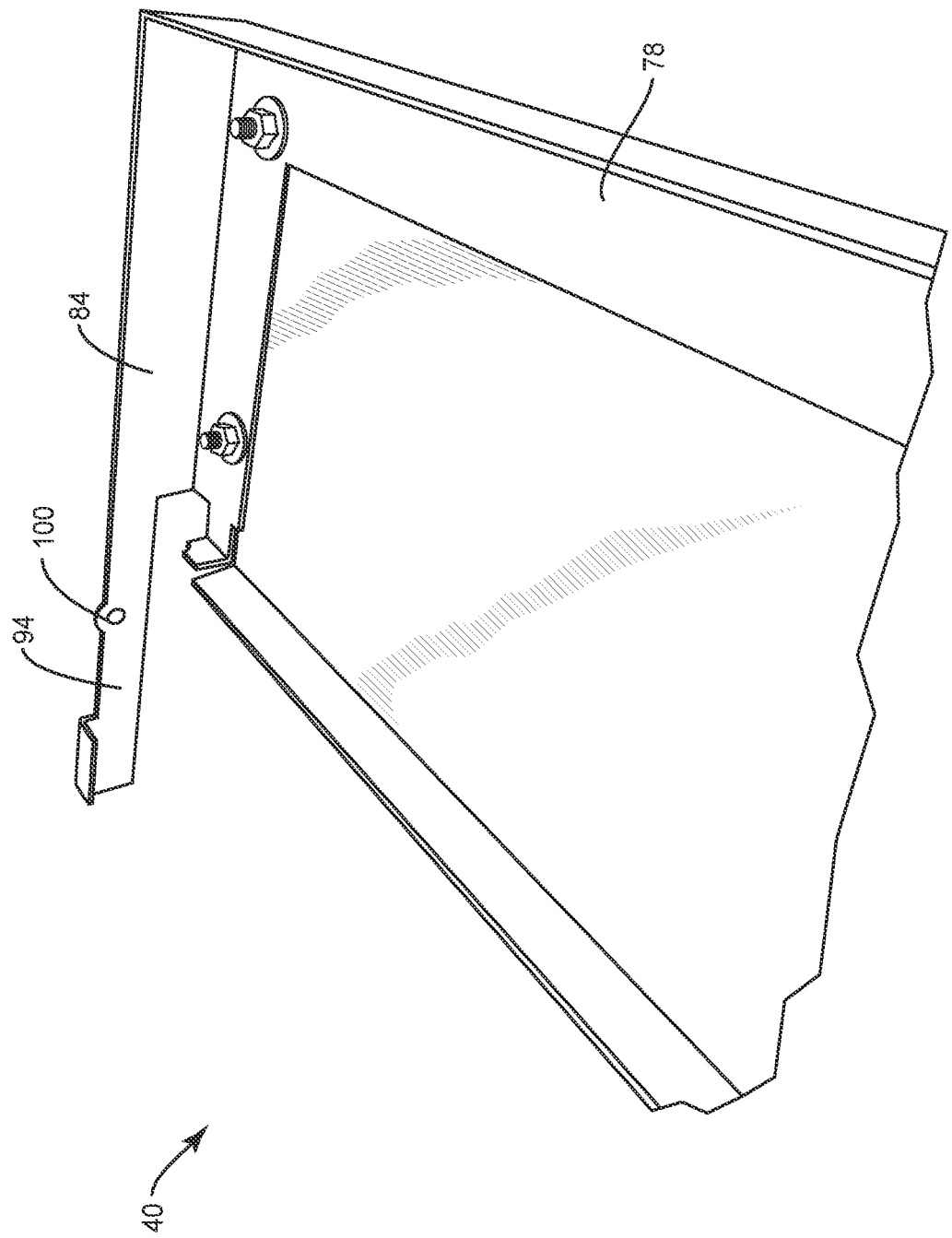
FIG. 11 is a break away perspective view of the components shown in FIG. 1.
Figure 12:
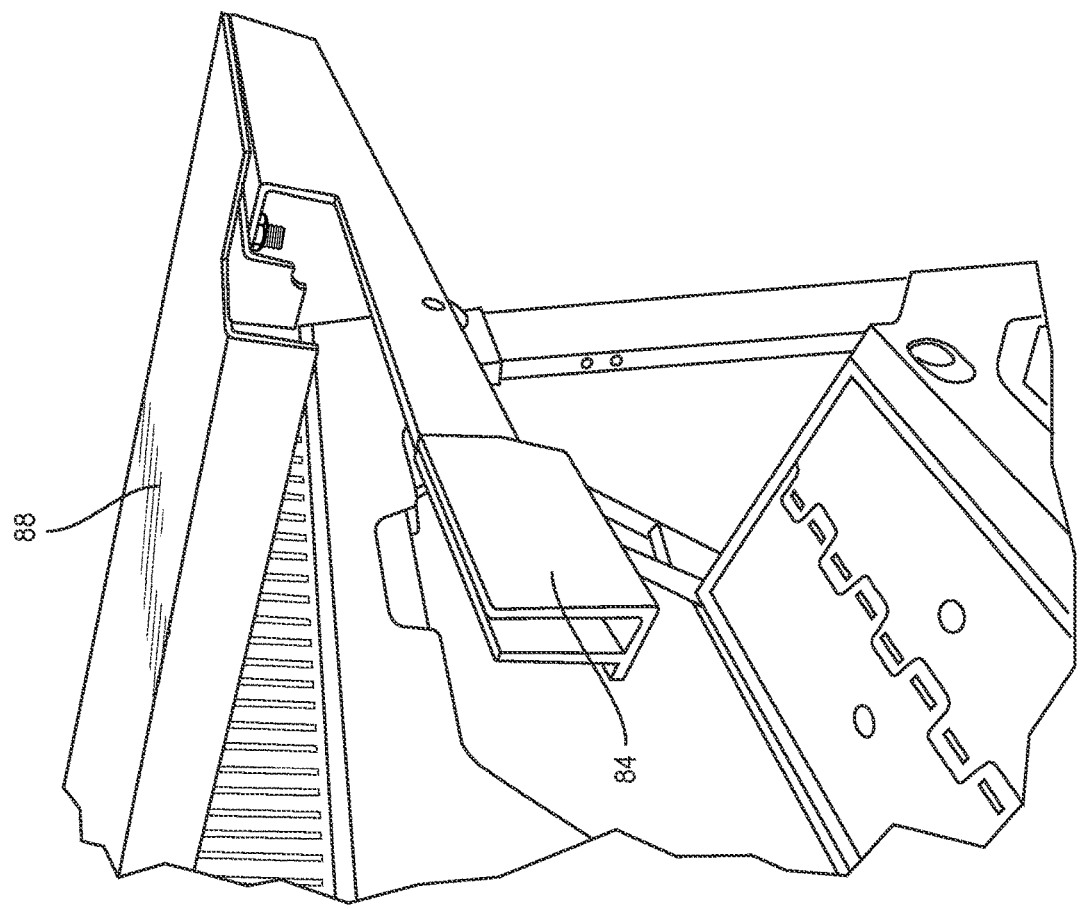
FIG. 12 is a break away perspective view of components shown in FIG. 1.
Figure 13:
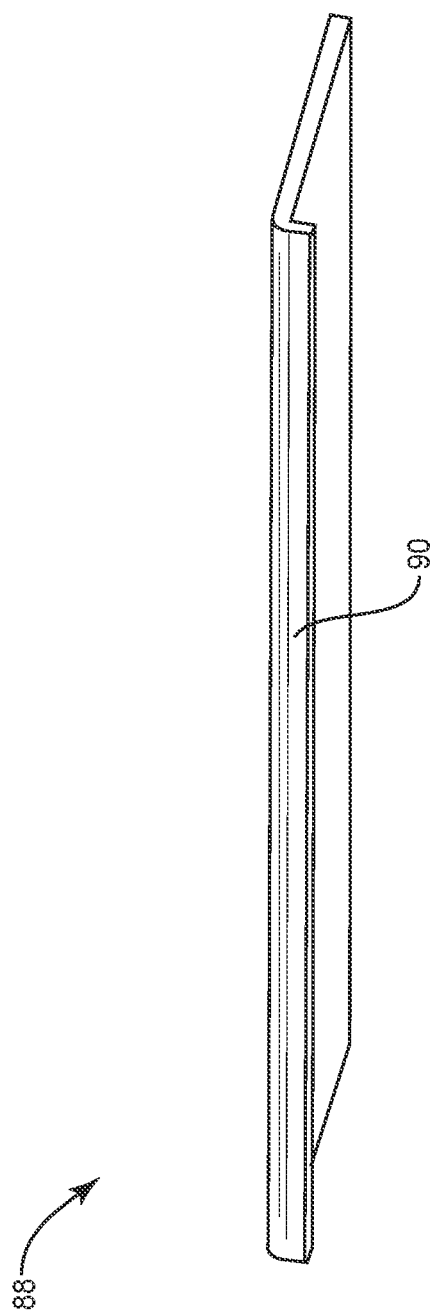
FIG. 13 is perspective view of components shown in FIG. 1.

Extension 40 includes a frame 78 including an end 80 and an end 82, as shown in FIGS. 1, 2 and 11. A bracket 84 engages extension 40 at end 80 and a bracket 86 engages extension 40 at end 82. A platform 88 including a lip 90 is disposed between ends 80, 82, as shown in FIGS. 2 and 13. In some embodiments, a length of extension 40 can be variously configured depending on dimensions of lift 12, for example, a length of lift 12. In some embodiments, extension 40 can be manufactured from steel, including a steel diamond plate configuration.

Bracket 84 is configured for engagement with an end 92 of platform 18, as shown in FIG. 2. Bracket 84 includes an arm 94, a lower stop 96 and an upper stop 98, as shown in FIG. 9. Arm 94 is configured for rotatable engagement with end 92 of platform 18 via a fulcrum, for example, a pivot point P1, as shown in FIG. 1. Pivot point P1 is defined from an opening 100 defined from a surface of bracket 84 and an opening 102 defined from a surface of end 92, as shown in FIGS. 1 and 9. A pin 104 is configured for disposal through openings 100, 102. In some embodiments, pin 104 includes a clevis pin. Pin 104 is configured for disposal through openings 100, 102 to facilitate rotation of lower stop 96 in a downward direction and rotation of upper stop 98 in an upward direction. Pivot point P1 is configured to rotate extension 40 and provides safety such that extension 40 has a limited angle of rotation. To remove extension 40 from lift 12, pin 104 is removed from openings 100, 102.

A portion of end 80 is fixed to bracket 84, as shown in FIG. 9. In some embodiments, bracket 84 is monolithically formed with end 80. In some embodiments, a length of bracket 84 and/or extension 40 can be variously configured depending on dimensions of lift 12, for example, the length of lift 12. In some embodiments, bracket 84 can be welded or bolted to extension 40 to form frame 78 of extension 40. In some embodiments, bracket 86 is similar to bracket 84. Bracket 86 is configured for engagement with an end 93 of platform 18, as shown in FIG. 2 and includes a pivot point P2 (not shown).

When arm 94 is rotated in a direction, for example, a downward direction, shown by arrow A in FIG. 1, upper stop 98 and lower stop 96 operate in conjunction with lip 90 of platform 88 to limit downward rotation to a level, horizontal position. Lower stop 96 is configured to be positioned under end 92 and rotates in a direction, for example, a downward direction shown by arrow A in FIG. 1 as upper stop 98 is positioned above end 92 to rotate arm 94 in a direction, for example, an upward direction shown by arrow B in FIG. 1 to position extension 40 in the storage orientation.

Extension 42 is rotatable relative to platform 18 between a plurality of orientations, for example, a storage orientation and an operational orientation such that extension 42 engages structural support 26, as described herein. In some embodiments, extension 42 can be rotated at an angle relative to platform 18. In some embodiments, extension 42 can be incrementally rotated at a selected angle relative to platform 18. In some embodiments, extension 42 can be rotated at a selected angle of 0 to 90 degrees. In some embodiments, extension 42 is rotated orthogonally relative to platform 18. In some embodiments, extension 42 is independently rotatable relative to extension 40.

Extension 42 includes a frame 106 including an end 108 and an end 110, as shown in FIGS. 1 and 2. A bracket 112 engages extension 42 at end 108 and a bracket 114 engages extension 42 at end 110. A platform 116 including a lip 118 is disposed between ends 108, 110, as shown in FIG. 2. In some embodiments, a length of extension 42 can be variously configured depending on dimensions of lift 12, for example, a length of lift 12. In some embodiments, extension 42 can be manufactured from steel, including a steel diamond plate configuration.

Bracket 112 is configured for engagement with end 92 of platform 18, as shown in FIG. 2. Bracket 112 includes an arm 120, a lower stop 122 and an upper stop 124, as shown in FIG. 10. Arm 120 is configured for rotatable engagement with end 92 of platform 18 via a fulcrum, for example, a pivot point P3, as shown in FIG. 1. Pivot point P3 is defined from an opening 126 defined from a surface of bracket 112 and an opening 128 defined from a surface of end 92, as shown in FIGS. 1 and 10. A pin 130 is configured for disposal through openings 126, 128. In some embodiments, pin 130 includes a clevis pin. Pin 130 is configured for disposal through openings 126, 128 to facilitate rotation of lower stop 122 in a downward direction and rotation of upper stop 124 in an upward direction. Pivot point P3 is configured to rotate extension 42 and provides safety such that extension 42 has a limited angle of rotation. To remove extension 42 from lift 12, pin 130 is removed from openings 126, 128.

A portion of end 108 is fixed to bracket 112, as shown in FIG. 10. In some embodiments, bracket 112 is monolithically formed with end 108. In some embodiments, a length of bracket 112 and/or extension 42 can be variously configured depending on dimensions of lift 12, for example, the length of lift 12. In some embodiments, bracket 112 can be welded or bolted to extension 42 to form frame 106 of extension 42. In some embodiments, bracket 114 is similar to bracket 112. Bracket 114 is configured for engagement with end 93 of platform 18, as shown in FIG. 2 and includes a pivot point P4 (not shown). In some embodiments, pivot points P1, P2, P3 and P4 are slidable. In some embodiments, openings 100, 102 and 126, 128 are in a slot configuration.

When arm 120 is rotated in a direction, for example, a downward direction, shown by arrow C in FIG. 1, upper stop 124 and lower stop 122 operate in conjunction with lip 118 of platform 116 to limit downward rotation to a level, horizontal position. Lower stop 122 is configured to be positioned under end 92 and rotates in a direction, for example, a downward direction shown by arrow C in FIG. 1 as upper stop 124 is positioned above end 92 to rotate arm 120 in a direction, for example, an upward direction shown by arrow D in FIG. 1 to position extension 42 in the storage orientation.

In some embodiments, lift 12 includes a footboard (not shown). The footboard is configured to provide stability and safety to a user when a motorcycle or other vehicle is loaded onto lift 12. In some embodiments, the footboard can be variously shaped, for example, round, oval, oblong, triangular, rectangular, square, polygonal, irregular, uniform, non-uniform, and/or variable.

Figure 14:
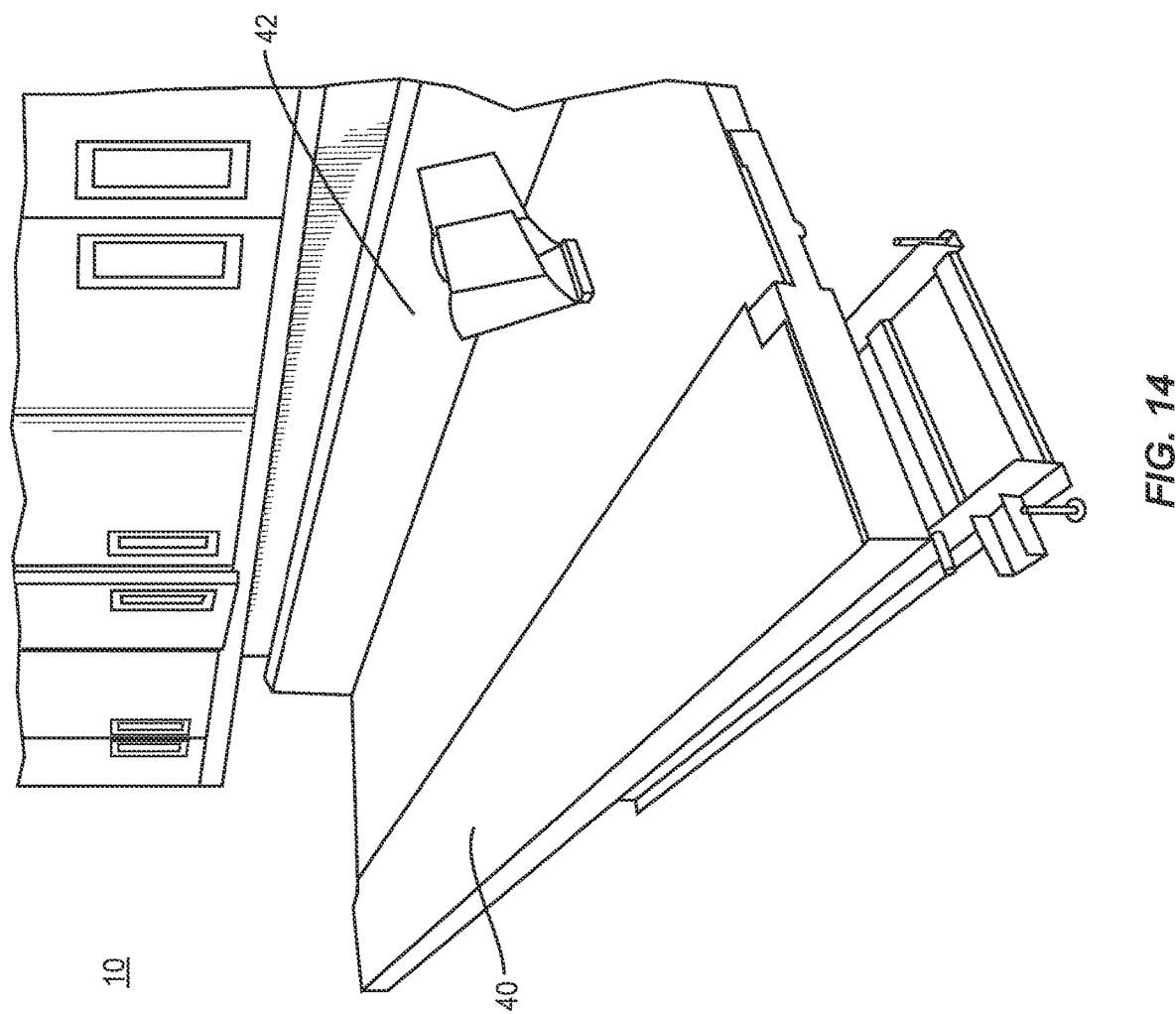
FIG. 14 is a perspective view of components shown in FIG. 1.

In some embodiments, as shown in FIG. 14, lift 12 is configured as a workbench when either or both side extensions 40, 42 are positioned in an operational orientation. In some embodiments, when lift 12 is employed as a work bench, side extension 40 and/or 42 can be rotated in a downward direction to create a work space for maintaining and/or repairing vehicles.

In some embodiments, components of motorcycle lift system 10 can be included in a kit configured to adapt to lifts and/or extensions.

In operation and use, motorcycle lift system 10 is configured to facilitate maintenance and loading of a motorcycle, and/or storage of lift 12. To place a motorcycle onto lift 12, jack 14 is expanded or contracted via foot pump 16 until platform 18 is positioned at a selected level for the motorcycle to be placed onto platform 18. Before placement of the motorcycle, lift 12 is in the operational orientation, as shown in FIG. 2. The motorcycle is then loaded onto platform 18. Jack 14 is expanded via foot pump 16 to elevate platform 18. Once the motorcycle is maintained or is loaded onto a vehicle, lift 12 is placed in the storage orientation, as shown in FIG. 1.

To position extensions 40, 42 into the storage orientation, arm 94 of bracket 84 of extension 40 is rotated in a direction, for example, a downward direction, as shown by arrow A in FIG. 1. Lower stop 96 is positioned under end 92 and is rotated in a downward direction as upper stop 98 is positioned above end 92 to rotate arm 94 in a direction, for example, an upward direction, as shown by arrow B in FIG. 1 to position extension 40 in the storage orientation. As bracket 84 rotates, bracket 86 parallels the operation of bracket 84.

Arm 120 of bracket 112 of extension 42 is rotated in a direction, for example, a downward direction, as shown by arrow C in FIG. 1. Lower stop 122 is positioned under end 92 and is rotated in a downward direction as upper stop 124 is positioned above end 92 to rotate arm 120 in a direction, for example, an upward direction, as shown by arrow D in FIG. 1 to position extension 42 in the storage orientation. As bracket 112 rotates, bracket 114 parallels the operation of bracket 112.

To position extensions 40, 42 in an operational orientation, arm 94 of bracket 84 of extension 40 is rotated in a direction, for example, an upward direction, as shown by arrow B in FIG. 1. Lower stop 96 is rotated in an upward direction as upper stop 98 is positioned under end 92 to rotate arm 94 in a direction, for example, a downward direction, as shown by arrow A in FIG. 1 to position extension 40 in the operational orientation. As bracket 84 rotates, bracket 86 parallels the operation of bracket 84.

Arm 120 of bracket 112 of extension 42 is rotated in a direction, for example, an upward direction, as shown by arrow D in FIG. 1. Lower stop 122 is rotated in an upward direction as upper stop 124 is positioned under end 92 to rotate arm 120 in a direction, for example, a downward direction, as shown by arrow C in FIG. 1 to position extension 42 in the operational orientation. As bracket 112 rotates, bracket 114 parallels the operation of bracket 112.

Figure 15:
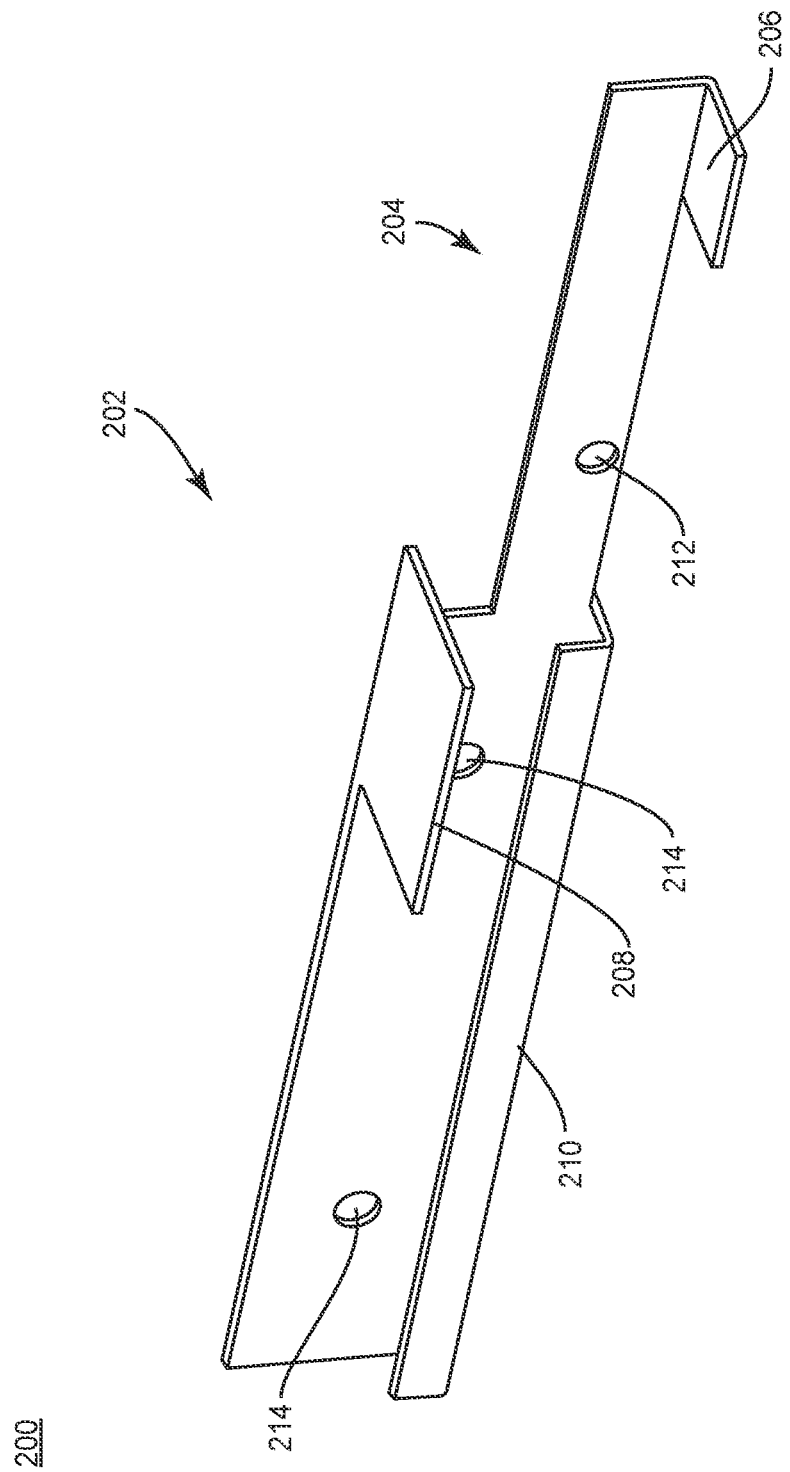
FIG. 15 is a perspective view of components of one embodiment of a motorcycle lift system in accordance with the principles of the present disclosure.

In one embodiment, as shown in FIG. 15, motorcycle lift system 200, similar to the systems and methods described herein, includes an extension (not shown) that includes a bracket 202. Bracket 202 is similar to brackets 84, 86 and 112, 114 of motorcycle lift system 10, described above. Bracket 202 includes an arm 204, a flat lower stop 206 and a flat upper stop 208. Bracket 202 includes a channel 210 configured for engagement with a portion of the extension (not shown). Bracket 202 includes an opening 212 configured for engagement with an opening (not shown) defined from a surface of an end of a platform (not shown) and a pin (not shown) to create a pivot point. Bracket 202 includes one or more openings 214 configured for disposal of a bolt (not shown) for attachment to the extension (not shown).

Figure 16:
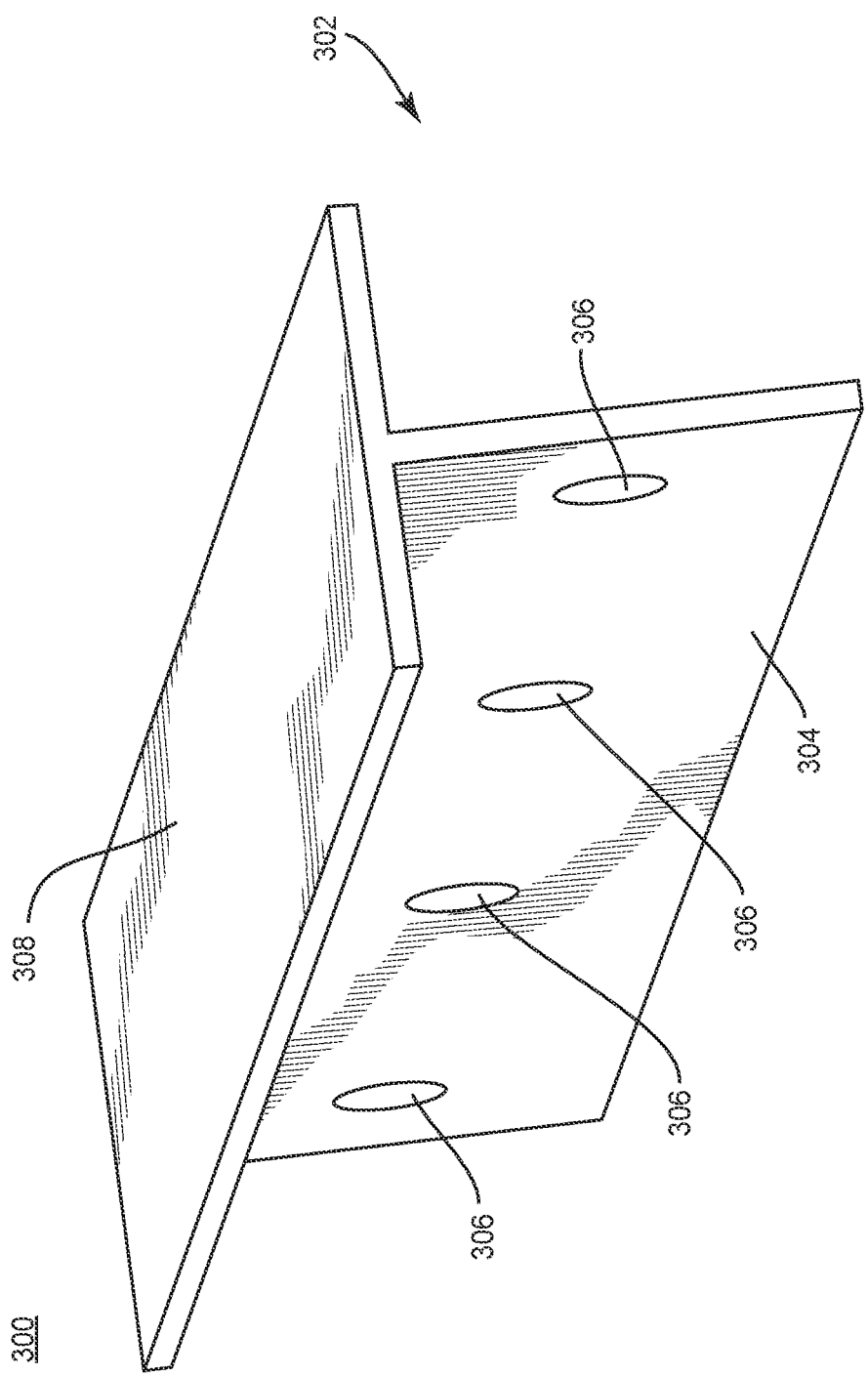
FIG. 16 is a perspective view of components of one embodiment of a motorcycle lift system in accordance with the principles of the present disclosure.

In one embodiment, as shown in FIG. 16, motorcycle lift system 300, similar to the systems and methods described herein, includes a platform 302. Platform 302 is similar to platforms 88, 116 of motorcycle lift system 10. Platform 302 includes an attachment plate 304 configured to fixedly engage with extensions 40 or 42 of motorcycle lift system 10. Plate 304 includes a plurality of openings 306 configured to engage with bolts (not shown) to fix plate 304 with extensions 40 or 42. In some embodiments, plate 304 can be welded to extensions 40 or 42. Platform 302 includes a lip 308 that is similar to lips 90, 118 of motorcycle lift system 10. Platform 302 and lip 308 form a T-shape.

Figure 17:
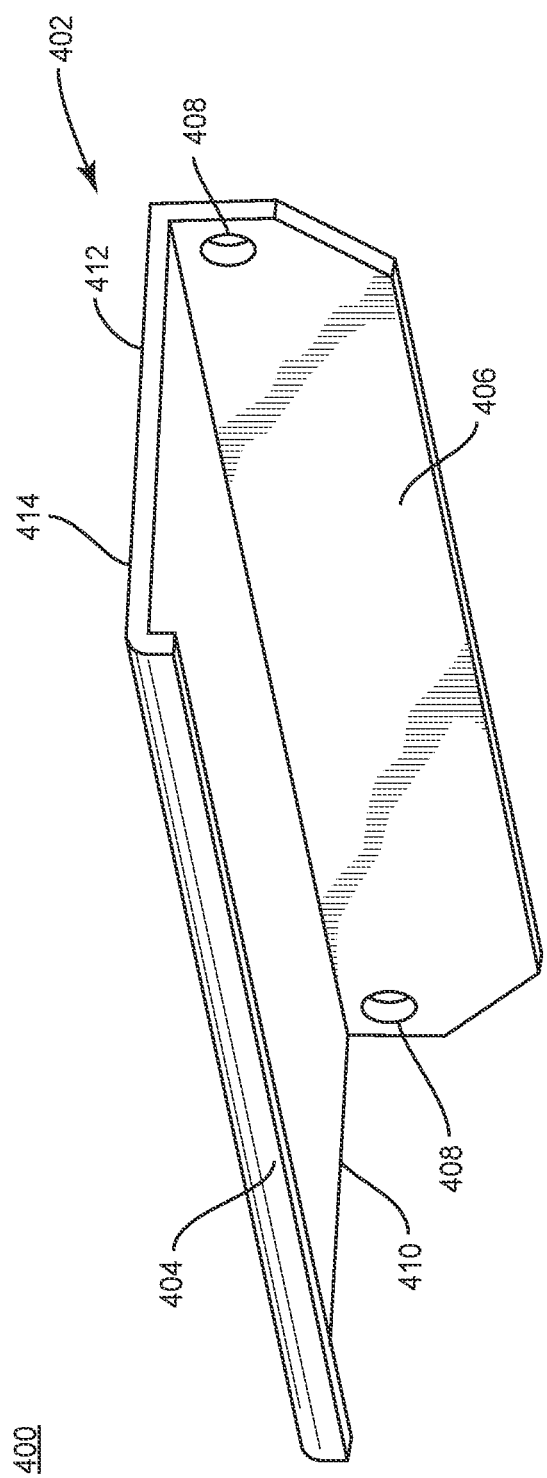
FIG. 17 is a perspective view of components of one embodiment of a motorcycle lift system in accordance with the principles of the present disclosure.

In one embodiment, as shown in FIG. 17, motorcycle lift system 400, similar to the systems and methods described herein, includes a platform 402. Platform 402 is similar to platforms 88, 116 of motorcycle lift system 10. Platform 402 includes a lip 404 that is similar to lips 90, 118 of motorcycle lift system 10. Platform 402 includes a frame 406 that is similar to frame 78 of motorcycle lift system 10. A surface of frame 406 defines a plurality of openings 408 configured to engage with bolts (not shown) to fix frame 406 with extensions 40 or 42. In some embodiments, platform 402 can be manufactured from steel, including a steel diamond plate configuration. In some embodiments, brackets 84, 86 and/or 112, 114 of motorcycle lift system 10 can be fixed to frame 406 at an end 410, an end 412 and/or below a top 414 of platform 402. In some embodiments, platform 402 includes ends (not shown) that extend in a downward direction relative to platform 402. In some embodiments, one or more openings (not shown) are defined from a surface of the ends. The one or more openings are each configured for engagement with a bolt (not shown) to fix bracket 202 of motorcycle lift system 200 with the ends of platform 402. In some embodiments, the ends engage bracket 202 via welding.

Figure 18:
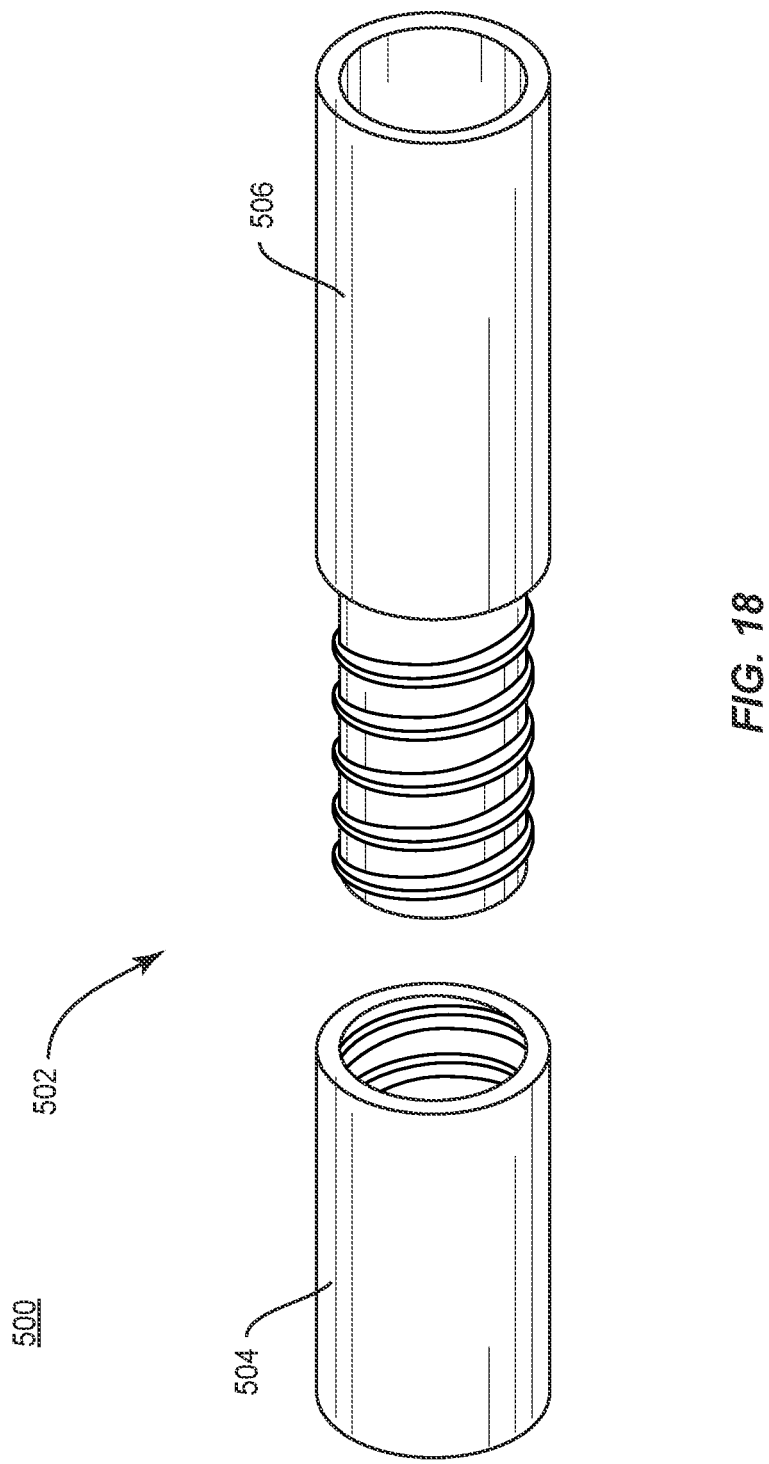
FIG. 18 is a perspective view with parts separated of components of one embodiment of a motorcycle lift system in accordance with the principles of the present disclosure.

In one embodiment, as shown in FIG. 18, motorcycle lift system 500, similar to the systems and methods described herein, includes a structural support 502. Structural support 502 is similar to structural supports 24, 26 of motorcycle lift system 10, described above. Structural support 502 is configured for engagement with extensions (not shown) similar to extensions 40, 42. Structural support 502 includes a receiver 504 and an insert 506 configured for disposal with receiver 504 to fix support 502 with a lift, similar to lift 12 of motorcycle lift system 10. In some embodiments, receiver 504 engages with insert 506 via a threaded engagement. In some embodiments, one or more structural supports are used in motorcycle lift system 500. In some embodiments, 2 or 3 structural supports are used in motorcycle lift system 500.

Figure 19:
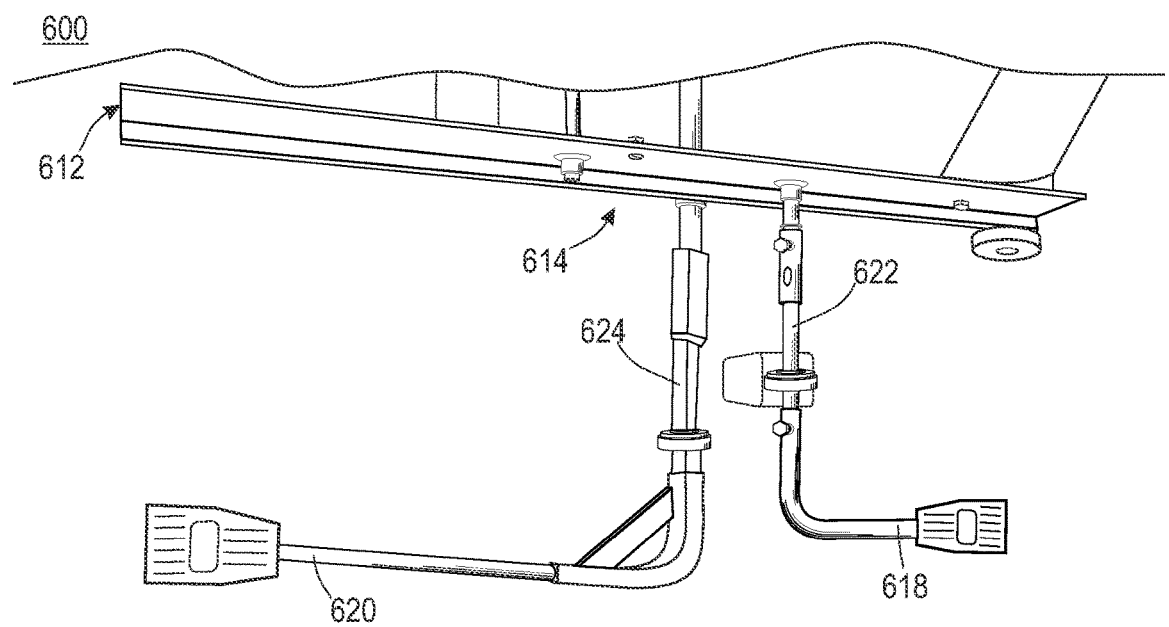
FIG. 19 is a break away perspective view of components of one embodiment of a motorcycle lift system in accordance with the principles of the present disclosure.
Figure 20:
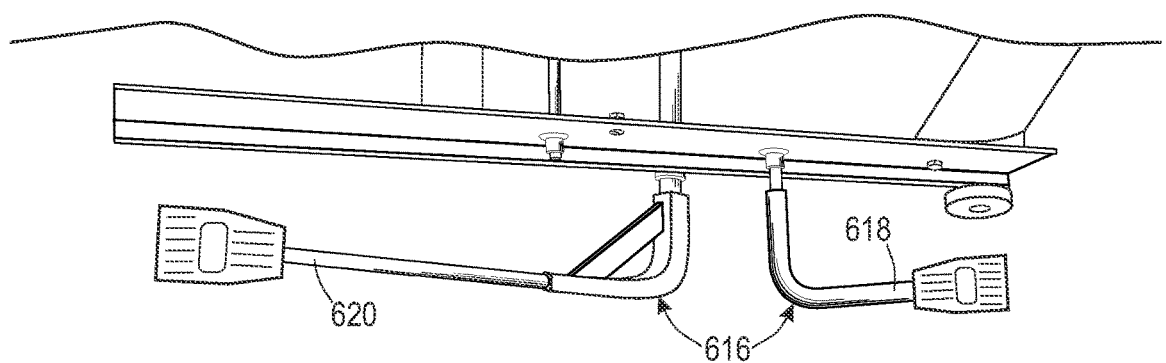
FIG. 20 is a break away perspective view of components shown in FIG. 19.
Figure 21:
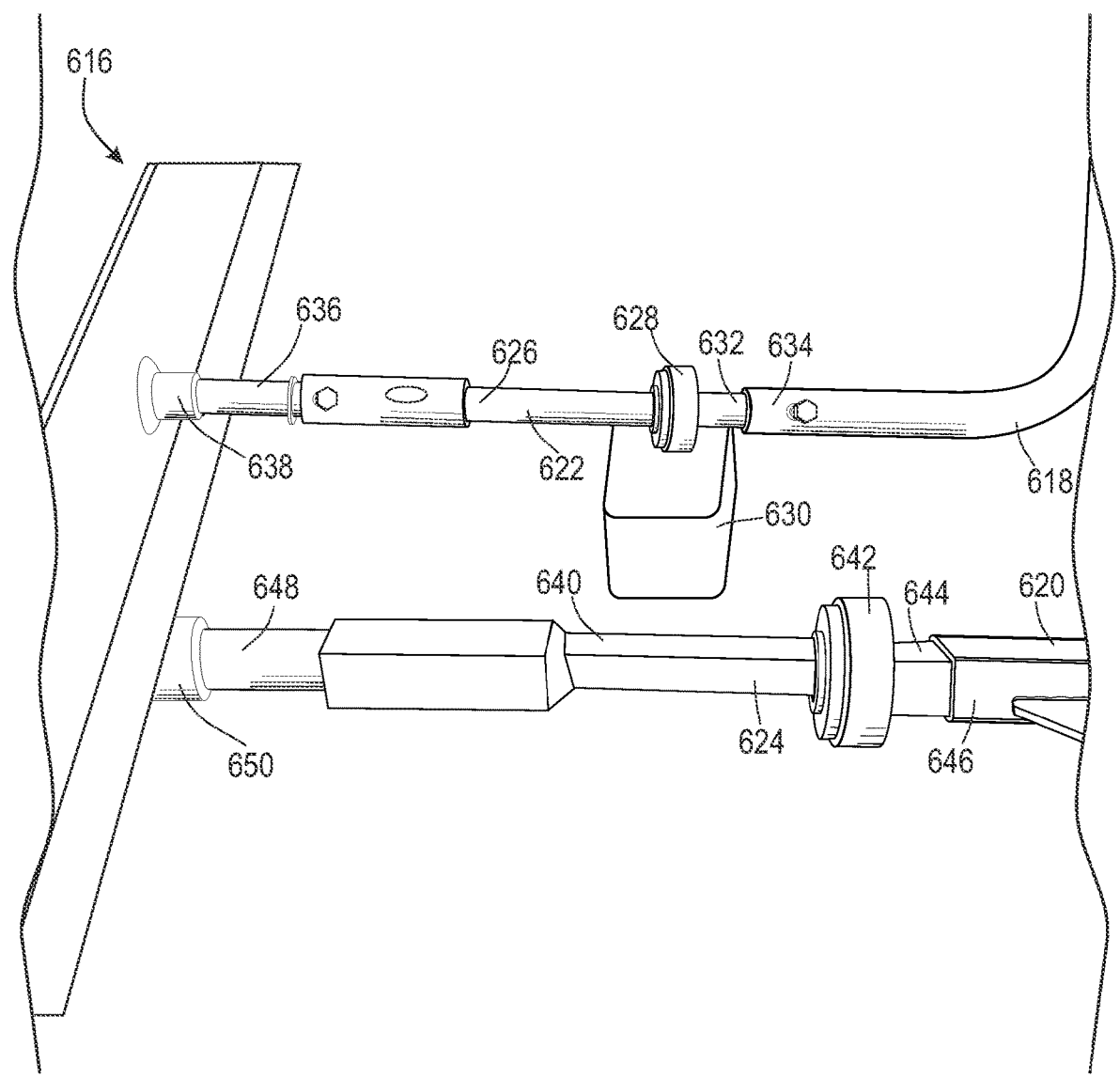
FIG. 21 is an enlarged perspective view of components shown in FIG. 19.

In one embodiment, as shown in FIGS. 19-21, motorcycle lift system 600, similar to the systems and methods described herein, includes a lift 612, as shown in FIG. 19. Lift 612 is similar to lift 12 of motorcycle lift system 10. Lift 612 includes a jack 614 similar to jack 14 of motorcycle lift system 10. Jack 614 is configured to expand and contract via a pneumatic foot pump 616 to elevate a platform (not shown) of lift 612. Foot pump 616 is similar to foot pump 16 and the platform is similar to platform 18 of motorcycle lift system 10. Foot pump 616 includes a pair of pedals 618, 620, as shown in FIG. 20. Pedals 618, 620 are configured for engagement with a pair of pedal extensions 622 and 624, as shown in FIG. 19. Pedal extensions 622, 624 are configured to extend pedals 618, 620 beyond a side extension (not shown) of lift 612 to facilitate clearance of pedals 618, 620 relative to the side extension. The side extension is similar to side extension 40 and/or side extension 42 of motorcycle lift system 10. In some embodiments, the side extension is in an operational orientation, as described herein, and pedals 618, 620 are implemented to expand and contract lift 612 to elevate the platform.

Pedal extension 622 is configured for releasing pressure, for example, hydraulic pressure produced by pedal extension 624 such that the platform of lift 612 is lowered relative to the floor. Pedal extension 622 includes a rod 626, a bearing 628 and a base, for example, a block 630, as shown in FIG. 21. Block 630 is configured to contact rod 626 and/or bearing 628 and to engage a surface, for example, a floor that lift 612 is disposed on. An end 632 of rod 626 is configured for engagement with an end 634 of pedal 618. An end 636 of rod 626 is configured for engagement with an end 638 of jack 614. In some embodiments, engagement between end 632 and end 634 and/or engagement between 636 and end 638 is in a snap fit engagement, a friction fit engagement, and/or a male/female engagement. In some embodiments, rod 626 can be variously configured, including irregular, uniform, non-uniform, offset, staggered, undulating, arcuate, variable and/or tapered.

Pedal extension 624 is configured to pump pressure into jack 614 such that the platform is elevated. Pedal extension 624 includes a rod 640 and a bearing 642. An end 644 of rod 640 is configured for engagement with an end 646 of pedal 620. An end 648 of rod 640 is configured for engagement with an end 650 of jack 614. In some embodiments, engagement between end 644 and end 646 and/or engagement between 648 and end 650 is in a snap fit engagement, a friction fit engagement, and/or a male/female engagement. In some embodiments, rod 640 can be variously configured, including irregular, uniform, non-uniform, offset, staggered, undulating, arcuate, variable and/or tapered.

Bearings 628 and 642 are configured to retain pedal extensions 622 and 624 in a straight orientation during pivoting of pedal extensions 622 and 624. In some embodiments, pedal extensions 622 and 624 are pivotable from more than 0 to 90 degrees relative to lift 612.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A vehicle lift comprising: a mechanical lift including a platform; at least one extension including an extension platform having a first end, a second end, a top platform surface and a bottom platform surface, the extension platform including a lateral end, the lateral end being a furthest end from the lift platform, and being movable relative to the lift platform; a support including a plurality of spaced apart inserts positionable longitudinally along the bottom platform surface and being movable relative to the lift platform; and a plurality of receivers fixed with the platform, the inserts being disposed within and axially movable relative to the at receivers such that the inserts are extendable along the bottom platform surface from the lift platform to the lateral end and are engageable with the bottom platform surface.

2. The vehicle lift as recited in claim 1, wherein the at least one extension includes a first side extension and a second side extension.

3. The vehicle lift as recited in claim 2, wherein the first side extension is rotatable relative to the lift platform and the second side extension is rotatable relative to the lift platform.

4. The vehicle lift as recited in claim 2, wherein the first side extension and the second side extension are each engaged with a first bracket and a second bracket, respectively.

5. The vehicle lift as recited in claim 4, wherein the first and second brackets of the first side extension are rotatably engaged with a first edge of the lift platform and the first and second brackets of the second side extension are rotatably engaged with a second edge of the lift platform opposing the first edge.

6. The vehicle lift as recited in claim 5, wherein each of the first and second brackets of the first and second side extensions include an arm, the arm including an upper stop, a lower stop and a fulcrum.

7. The vehicle lift as recited in claim 6, wherein each of the fulcrums pivot the first and second side extensions respectively.

8. The vehicle lift as recited in claim 6, wherein the arm of each of the first and second brackets of each of the first and second side extensions pivotably engage the lift platform via a pin.

9. The vehicle lift as recited in claim 6, wherein the upper and lower stops limit rotation of each of the first and second side extensions.

10. The vehicle lift as recited in claim 2, wherein each of the first and second side extensions include a downward pointing lip on an inner edge.

11. The vehicle lift as recited in claim 10, wherein each of the inner edges are engageable over a top of an upturned lip of the lift platform.

12. The vehicle lift as recited in claim 10, wherein the at support includes a first support and further comprising a second support, each of the first and second supports operate in conjunction with first and second brackets and each of the downturned pointing lips of each of the first and second extension platforms.

13. A motorcycle lift comprising: a mechanical lift including a lift platform; a first tubular receiver fixed with the lift platform, a first support including a plurality of spaced apart inserts being disposed within and axially movable relative to the first tubular receiver; a second tubular receiver fixed with the lift platform, a second support including a plurality of spaced apart inserts being disposed within and axially movable relative to the second tubular receiver; a first side extension including an extension platform having a first end, a second end, a top platform surface and a bottom platform surface, the extension platform including a lateral end, the lateral end being a furthest end from the lift platform, and being rotatable relative to the lift platform; and a second side extension including an extension platform having a first end, a second end, a top platform surface and a bottom platform surface, the second extension platform including a lateral end, the lateral end of the second extension platform being a furthest end from the lift platform on the second extension platform, and being rotatable relative to the lift platform, the inserts of the first support being positionable longitudinally along the bottom platform surface of the first extension platform and extendable along the bottom platform surface of the first extension platform from the lift platform to the lateral end of the first extension platform for engagement with the bottom platform surface of the first extension platform and/or the inserts of the second support being positionable longitudinally along the bottom platform surface of the second extension platform and extendable along the bottom platform surface of the second extension platform from the lift platform to the lateral end of the second extension platform for engagement with the bottom platform surface of the second extension platform.

14. The motorcycle lift as recited in claim 13, wherein the first side extension and the second side extension are each engaged with a first bracket and a second bracket, respectively.

15. The motorcycle lift as recited in claim 14, wherein each of the first and second brackets include an arm, each of the arms including an upper stop, a lower stop and a fulcrum.

16. The motorcycle lift as recited in claim 15, wherein the upper and lower stops limit rotation of each of the first and second side extensions.

17. A motorcycle lift comprising: a mechanical lift including a platform, the lift platform including a first support including a plurality of spaced apart inserts and a second support including a plurality of spaced apart inserts; a first tubular receiver fixed with the lift platform, the inserts of the first support being disposed within and axially movable relative to the first tubular receiver; a second tubular receiver fixed with the lift platform, the inserts of the second support being disposed within and axially movable relative to the second tubular receiver; a first side extension including an extension platform having a first end, a second end, a top platform surface and a bottom platform surface, the extension platform including a lateral end, the lateral end being a furthest end from the lift platform, and being rotatable relative to the lift platform between a first orientation and a second orientation such that the inserts of the first support are extendable along the bottom platform surface to the lateral end and engageable with the bottom platform surface for weight distribution of a weight applied to the top platform surface; and a second side extension including an extension platform having a first end, a second end, a top platform surface and a bottom platform surface, the second extension platform including a lateral end, the lateral end of the second side extension being a furthest end from the lift platform, and being rotatable relative to the lift platform between a first orientation and a second orientation such that the inserts of the second support are extendable along the bottom platform surface from the lift platform to the lateral end of the second extension and engageable with the bottom platform surface of the second extension platform for weight distribution of a weight applied to the top platform surface of the second extension platform.

\* \* \* \* \*